(12) United States Patent
McHugh

(10) Patent No.: US 6,341,622 B1
(45) Date of Patent: Jan. 29, 2002

(54) PRESSURE RELIEF VALVE AND ARRANGEMENT FOR FIRE SUPPRESSION WATER SPRINKLER SYSTEM

(75) Inventor: George J. McHugh, Broomall, PA (US)

(73) Assignee: AGF Manufacturing, Inc., Malvern, PA (US)

( * ) Notice: Subject to any disclaimer, the term of this patent is extended or adjusted under 35 U.S.C. 154(b) by 0 days.

(21) Appl. No.: 09/377,179

(22) Filed: Aug. 19, 1999

Related U.S. Application Data

(63) Continuation of application No. 09/235,834, filed on Jan. 22, 1999, now Pat. No. 6,302,146.

(51) Int. Cl.[7] ............................................. F16K 15/18
(52) U.S. Cl. ..................... 137/523; 251/83; 251/118; 251/263
(58) Field of Search ................... 137/523, 540, 137/542, 543.15, 535, 559, 557, 551; 251/118, 83, 263

(56) References Cited

U.S. PATENT DOCUMENTS

| | | | | |
|---|---|---|---|---|
| 291,818 A | * | 1/1884 | Tudor | 251/83 X |
| 753,634 A | * | 3/1904 | Sankey | 251/263 |
| 1,196,862 A | * | 9/1916 | Hayes | 137/523 |
| 1,436,650 A | * | 11/1922 | Gilbert | 137/523 |
| 2,244,311 A | * | 6/1941 | Nee et al. | 251/118 |
| 2,634,748 A | * | 4/1953 | Morrison | 137/523 |
| 2,641,437 A | * | 6/1953 | Jay et al. | 251/83 |
| 2,922,436 A | * | 1/1960 | Brash | 137/523 |
| 2,933,139 A | | 4/1960 | O'Rear | 169/23 X |
| 3,422,840 A | * | 1/1969 | Bryant et al. | 137/384 |
| 3,825,766 A | | 7/1974 | Connor et al. | 169/61 X |
| 4,561,471 A | | 12/1985 | Diaz | 137/870 |
| 4,580,596 A | * | 4/1986 | Stehling | 137/523 |
| 4,643,224 A | | 2/1987 | Rung et al. | 137/559 |
| 4,655,078 A | | 4/1987 | Johnson | 73/168 |
| 4,741,361 A | | 5/1988 | McHugh | |
| 4,852,610 A | | 8/1989 | McHugh | |
| 4,971,109 A | | 11/1990 | McHugh | |
| 4,995,423 A | | 2/1991 | McHugh | |
| 5,018,386 A | | 5/1991 | Zeoli | 73/168 |
| 5,090,446 A | * | 2/1992 | Hunter et al. | 137/540 |
| 5,103,362 A | | 4/1992 | McHugh | |
| 5,178,185 A | * | 1/1993 | Stehling et al. | 137/543 |
| 5,320,138 A | | 6/1994 | Ferlitch, Jr. | 137/559 X |
| 5,406,979 A | | 4/1995 | McHugh | |
| 5,662,139 A | * | 9/1997 | Lish | 137/523 |
| 5,864,287 A | | 1/1999 | Evans, Jr. et al. | 137/551 X |

* cited by examiner

*Primary Examiner*—John Rivell
(74) *Attorney, Agent, or Firm*—Burns, Doane, Swecker & Mathis L.L.P.

(57) ABSTRACT

A valve and an arrangement for a fire suppression water sprinkler system includes a valve which has an inlet and an outlet with a restricted orifice to limit the flow through the valve to correspond to the flow through a single sprinkler head. The valve has a biasing member so that the valve opens when the pressure in the inlet exceeds a predetermined pressure and the valve may be opened manually to test the system or to drain the system.

25 Claims, 3 Drawing Sheets

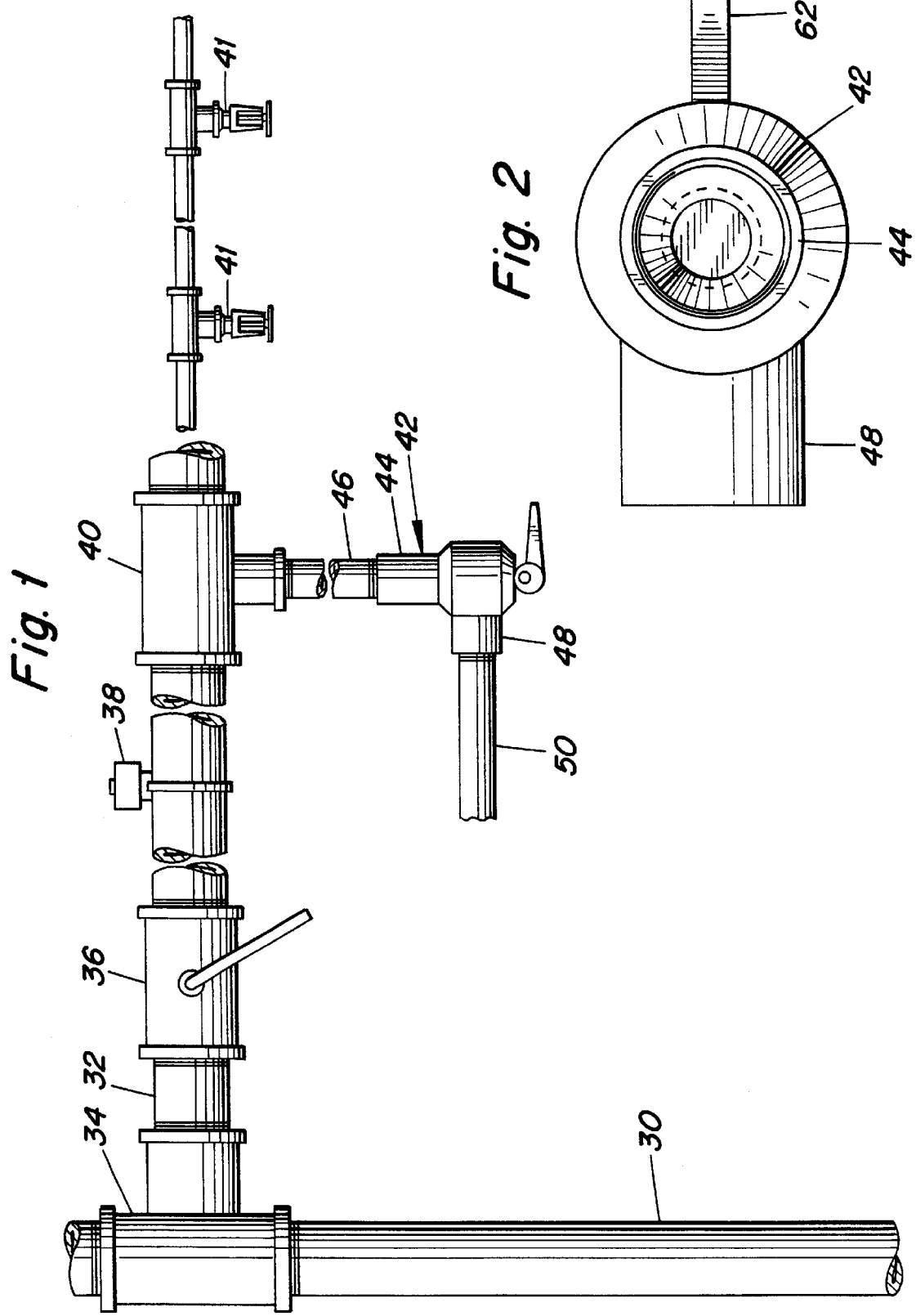

PRESSURE RELIEF VALVE AND ARRANGEMENT FOR FIRE SUPPRESSION WATER SPRINKLER SYSTEM

This application is a continuation 35 U.S.C. §§119 and/or 365 to application Ser. No. 09/235,834 filed in the United States on Jan. 22, 1999 now Pat. No. 6,302,146; the entire content of which is hereby incorporated by reference.

BACKGROUND AND SUMMARY OF THE PRESENT INVENTION

The present invention relates generally to pressure relief valves and more particularly relates to valve arrangements for use in testing and draining fire suppression water sprinkler systems.

In a typical fire suppression water sprinkler system as installed in many buildings, an array of individual water sprinklers is supplied with water through a main conduit and various branch conduits. The individual water sprinklers are generally provided with a member that melts when the ambient temperature reaches a predetermined level indicative of a fire. The melting of the member opens a water sprinkler to spray water in order to suppress the fire. The individual water sprinklers are provided with meltable members so that the spray of water will hopefully be limited to the region of the building where the fire is present. In this way, the extent of water damage may be minimized.

After a fire, and especially during maintenance and renovation, it may become necessary to replace one or more of the individual water sprinklers. At such times it is desirable to be able to drain the system of water conduits, so that the removal of one or more of the individual water sprinklers (after the supply of water to the main conduit has been turned off and after the system has been drained) will not result in a flow of water through the fitting for the water sprinkler. Accordingly, it is conventional in the art to provide a valve which when opened will drain the water conduits of the system.

Such fire suppression systems also oftentimes have a switch or sensor that detects the flow of water in the conduits to indicate that even only one of the individual water sprinklers has opened. Since the flow of water in the conduits generally means that a fire is present in the building, the switch or sensor typically triggers a fire alarm or sends an appropriate signal directly to a fire department. Therefore, many fire codes require, and it is otherwise desirable, that the switch or sensor which detects the flow of water in the conduits be periodically tested. Accordingly, it has also become conventional in the art to provide a valve which enables the system to be tested by permitting a flow of water corresponding to the flow through only one individual water sprinkler that has been opened.

In addition, it is desirable (and sometimes required by the applicable fire code) to be able to visually observe the flow of water from the testing valve. Since the testing valve (and oftentimes the drainage valve) is frequently connected directly to a drain pipe, it is conventional to provide a sight glass downstream of the testing valve (and sometimes the drainage valve). It is, of course, possible to alternatively place a sight glass upstream of the testing valve. Also, since it is typically desirable to determine the pressure of the water upstream of the testing valve, prior to and during a test operation, it is conventional to provide a fitting or port to receive a pressure gauge upstream of the testing valve.

In fire protection systems, it is sometimes desirable or necessary (and may be required by local ordinance) to provide a pressure relief mechanism in the fire sprinkler system in communication with the arrangement of piping that supplies water (or some other fluid) to the individual sprinkler heads. In order to provide a pressure relief feature for a fire sprinkler system, it is known to provide a Tee fitting in the piping arrangement in communication with the sprinkler heads and to connect an inlet of a suitable, conventional pressure relief valve with the arrangement of piping through one of the openings in the Tee fitting. The outlet of the pressure relief valve is then directed as desired, either to a drain or outside of the structure being protected by the fire sprinkler system.

In one known arrangement, the outlet of the pressure relief valve is connected by way of another Tee fitting to a drain. The drain is in turn in communication with the arrangement of piping through a globe valve. In this way, when the globe valve is closed, and the pressure in the arrangement of piping remains below a predetermined value, the arrangement of piping may be maintained in a pressurized state. However, when it is desired to drain the system, the globe valve may be opened. In addition, when the pressure in the arrangement of piping exceeds the predetermined value, the pressure relief valve opens to direct the fluid in the arrangement of piping into the drain and thereby relieve the excessive pressure.

The use of separate pressure relief valves and drainage valves and testing valves results in significant time and expense during the installation of such plumbing. For example, in U.S. Pat. No. 5,103,862 issued on Apr. 14, 1992 to AGF Manufacturing, Inc., a separate pressure relief valve is provided in combination with a test and drain valve. The inlet of the separate pressure relief valve is provided in communication with an outlet of the test and drain valve. Preferably, the outlet of the pressure relief valve is provided in communication with the other outlet of the test and drain valve.

Accordingly, it is an object of the present invention to provide a pressure relief valve for a fire suppression water sprinkler system in which the pressure relief valve also permits a testing of the fire suppression water sprinkler system.

Yet another object of the present invention is to provide a valve arrangement for a fire suppression water sprinkler system which provides a pressure relief feature and a testing feature in a single valve.

Still another object of the present invention is to provide a valve arrangement for a fire suppression water sprinkler system which is relatively simple and easy to install and use.

Yet still another object of the present invention is to provide a valve arrangement for a fire suppression water sprinkler system having a pressure relief feature and a testing feature which is relatively inexpensive and relatively inexpensive to install.

These and other objects are accomplished by a valve and an arrangement for testing a fire suppression system having a pressure relief feature according to the present invention.

The arrangement according to the present invention comprises a conduit for supplying water to a plurality of sprinklers with a sensor provided for sensing the flow of water in the conduit. A valve is provided downstream of the sensor in communication with the conduit.

The valve according to the present invention comprises a valve housing having an inlet and an outlet. A valve member is biased at a predetermined amount toward a valve seat so as to maintain the valve in a closed condition unless and until the pressure at the inlet of the valve housing is greater than the predetermined bias of the valve member. The valve housing is provided with a restricted orifice corresponding to the flow through a single water sprinkler head so that when communication is permitted between the inlet and the outlet of the valve housing, the flow is restricted to correspond to the flow through the single water sprinkler head. An arrangement is provided to manually open the valve.

Preferably, a cam and lever mechanism is provided to pull the valve member away from the valve seat. In the preferred embodiment, the predetermined bias for the valve member is provided by a coil spring.

In operation, when the pressure in the conduit (i.e., the pressure in the inlet of the valve), exceeds the predetermined bias for the valve member, the valve opens to provide a pressure relief feature for the arrangement of sprinkler heads. When the valve member is manually moved away from the valve seat, the valve permits a flow through the valve corresponding to the flow through a single water sprinkler head. In this way, the sensor provided in the conduit upstream of the valve may be tested by determining whether the sensor triggers an alarm in response to a flow of water corresponding to the flow through a single sprinkler head.

Although the valve is restricted to only permit a flow through the valve corresponding to the flow through a single sprinkler head, the valve may also be used to drain the system, if desired, by manually opening the valve.

BRIEF DESCRIPTION OF THE DRAWINGS

Preferred embodiments of the present invention will be described in greater detail with reference to the accompanying drawings, wherein like members bear like reference numerals and wherein:

FIG. 1 is a front view of an arrangement for a fire suppression water sprinkler system according to the present invention;

FIG. 2 is a top view of a valve according to the present invention;

DETAILED DESCRIPTION OF THE PREFERRED EMBODIMENTS

Figure 3:
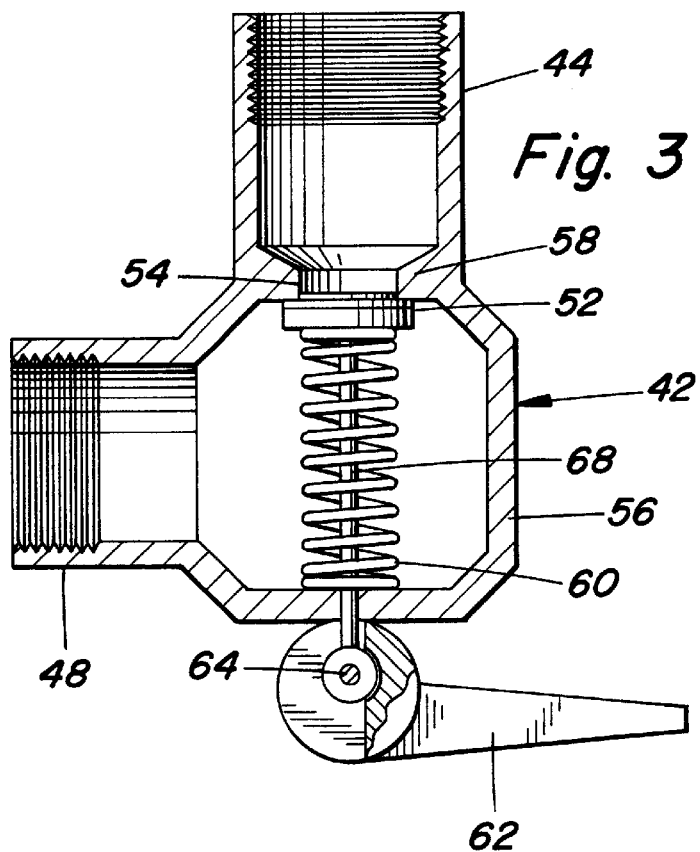
FIG. 3 is a side view in cross-section of the valve of FIG. 2, with the valve in a closed configuration.

With reference to FIG. 1, an arrangement for a fire suppression water sprinkler system according to the present invention includes a main conduit 30 for supplying water. The conduit 30 supplies a branch conduit 32 by way of a Tee fitting 34. A main valve 36 is provided for the branch conduit 32 with the main valve 36 operable to permit or to interrupt the flow of water through the branch conduit 32.

Downstream of the main valve 36 is provided a water flow switch 38. The water flow switch 38 is of suitable conventional design and typically includes a paddle or other member (not shown) which extends into the branch conduit 32. The paddle is connected to a switch which is closed when the flow of water through the branch conduit is sufficient to move the paddle a predetermined amount. Closure of the switch provides an electrical signal which may be used to trigger a fire alarm or to alert a fire department.

Downstream of the water flow switch 38 but upstream of a plurality of individual water sprinklers is a Tee fitting 40. The Tee fitting 40 is preferably provided at a location which is physically lower than the portion of the branch conduit 32 downstream of the Tee fitting 40 and also physically lower than all of the individual water sprinklers and the associated system of supply conduits which is supplied with water by the branch conduit 32. In this way, the entire water sprinkler system downstream of the Tee fitting 40 may be drained as desired through the Tee fitting 40.

As in conventional in the art, the individual fire sprinklers 41 are provided with a member that melts when the ambient temperature reaches a predetermined level indicative of a fire. Upon melting, the member opens the fire sprinkler to spray water to suppress the fire.

When it is desired to replace one or more of the individual water sprinklers, the valve 36 is closed and then the water sprinkler system is preferably drained, so that the removal of one or more of the individual water sprinklers will not result in a flow of water through the fitting for the water sprinkler.

The Tee fitting 40 provides communication between the branch conduit 32 and a valve 42 according to the present invention (see also FIG. 3). The valve 42 has an inlet 44 which is threaded onto a nipple 46 which is in turn threaded into the Tee fitting 40. Other arrangements for connecting the inlet of the valve to the branch conduit 32 will be readily obvious to one skilled in the art. An outlet 48 of the valve 42 is connected to a conduit 50 which may be provided with a pair of sight glasses (not shown) threadably received at two couplings of the conduit which are separated from each other by an angle of about 90 degrees. Alternatively, the sight glasses may be integrally provided in the outlet 48 of the valve 42, if desired (not shown).

With reference now to FIG. 3. the valve 42 according to the present invention corresponds generally to a suitable, conventional pressure relief valve which is well known in the art. As in the conventional pressure relief valve, a valve housing 56 is of unitary form and may be provided by casting or any other suitable fabrication method.

The valve housing 56 includes the inlet 44 and the outlet 48 which are preferably arranged at right angles with respect to one another. As in the conventional pressure relief valve, a valve member 52 preferably comprises a flat, dish-like member which is arranged to sealingly abut a valve seat 54. Preferably, the valve seat 54 is formed integrally with the valve housing, downstream of the valve inlet. The valve member 52 preferably includes a rigid member 53 (see FIG. 4) with a disk 55 made of a sufficiently resilient materials so as to sealingly engage the valve seat 54.

The valve seat 54 is preferably formed integrally in the valve housing 56. For example, the valve housing may be provided with an internal annular shoulder 58 which is then drilled to provide an opening of the desired size (see FIG. 2).

Figure 5:
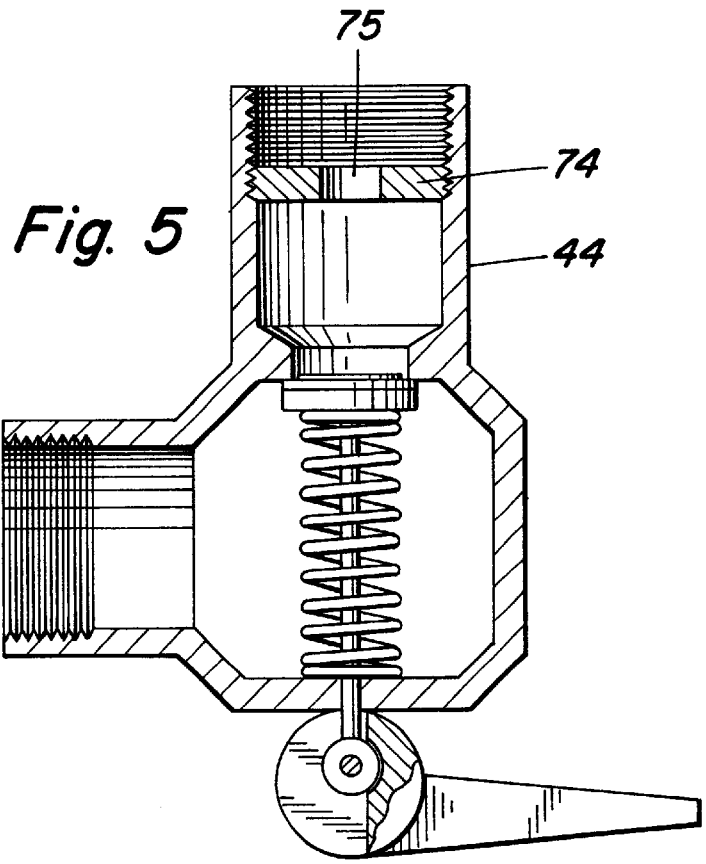
FIG. 5 is a side view in cross-section of another preferred embodiment of the valve of FIG. 2.
Figure 6:
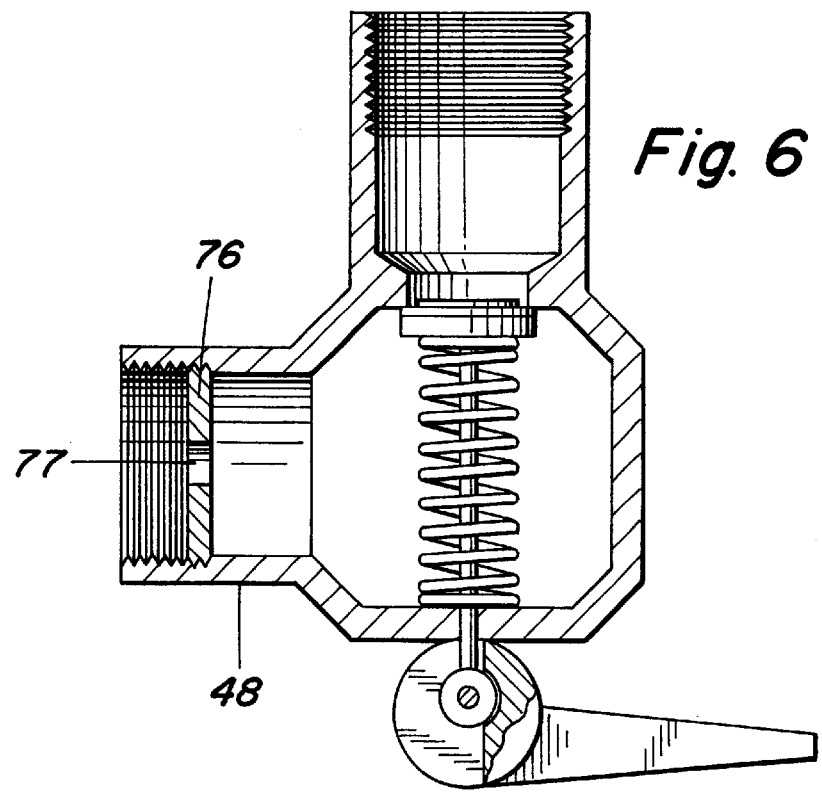
FIG. 6 is a side view in cross-section of another preferred embodiment of the valve of FIG. 2.

If desired, the flow through the valve from the inlet to the outlet may be restricted by an orifice of the appropriate size provided in the inlet or in the outlet. For example, an orifice comprising a threaded disk 74 having an opening 75 permitting a flow corresponding to the flow through a single sprinkler head may be provided in the inlet 44 of the valve 42 (see FIG. 5). With reference to FIG. 6, an orifice comprising a threaded disk 76 having an opening 77 permitting a flow corresponding to the flow through a single sprinkler head may be provided in the outlet 48 of the valve 42.

An arrangement such as dimples, or a particularly shaped opening in the disk may be provided to threadably insert and remove the disks 74, 76. Alternatively, the orifices 75, 77 may be provided in an integral shoulder provided in the valve housing separate from the valve seat.

According to the present invention, the opening provided in the valve seat 54 is sized so as to permit a flow through the valve corresponding to the flow through a single water sprinkler head.

The valve member 52 is biased against the valve seat 54 by a coil spring 60. The coil spring 60 preferably has a predetermined bias so as to maintain the valve member 52 sealingly against the valve seat 54 until the pressure in the valve inlet 44 exceeds the force urging the valve member 52 against the valve seat 58. When the pressure in the inlet 44 is sufficiently great, the valve member 52 is urged away from the valve seat, compressing the coil spring 60.

The pressure relief valve also includes a lever and cam 62 having a pin 64 which extends perpendicular to the cam. The lever and cam 62 are provided outside of the valve housing 56. The pin is provided off center with respect to the perimeter of the cam.

The pin 64 is received within an annular member 66 provided at one end of a rod 68. The rod 68 extends through the wall of the housing and through the center of the coil spring 60. The other end of the rod 68 extends through the valve member 52 and carries a disk 70 which is fixedly attached to the other end of the rod 68.

The disk 70 is positioned with the valve member 52 provided between the disk 70 and the coil spring 60 so that the disk 70 may move the valve member 52 away from the valve seat 54 and compress the coil spring 60 when the rod 68 is moved away from the valve seat 54.

Figure 4:
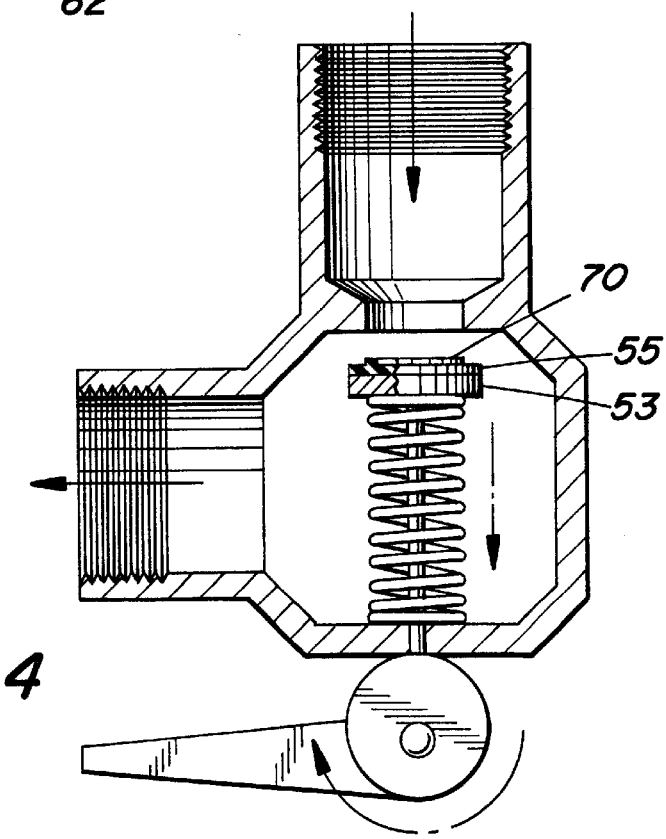
FIG. 4 is a side view in cross-section of the valve of FIG. 2, with the valve in an open configuration.

With reference to FIG. 4, when the cam and lever 62 are manually rotated in a generally semi-circular manner about the pin 64, the pin 64 moves away from the housing 56 and urges the rod 68 and the disk 70 away from the valve seat 54 to open the valve.

As desired, the manual opening of the valve 42 permits a flow through the valve corresponding to the flow through a single sprinkler head to enable the sensor 38 to be tested. In addition, the manual opening of the valve 42 permits the conduit in communication with the inlet of the valve to be drained, albeit at a relatively slow rate.

In addition, the valve according to the present invention provides a pressure relief function for the conduit and plurality of sprinkler heads in communication with the inlet 44 of the valve 42.

In operation, the valve 42 is provided with the inlet 44 in fluid communication with a conduit supplying water to a plurality of sprinkler heads. When the pressure in the conduit exceeds a predetermined amount corresponding to the predetermined spring bias of the coil spring in the valve, the valve opens to relieve the pressure in the conduit. In addition, the valve may be manually opened to provide a flow through the valve corresponding to the flow through a single sprinkler head either to enable a flow sensor connected to an alarm to be tested or to drain the conduit.

While the valve and arrangement according to the present invention have been described with references to a fire suppression water sprinkler system, it is expected that the valve and the arrangement may be of general utility in systems other than water sprinkler systems. Accordingly, the principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others without departing from the spirit of the present invention and it is expressly intended that all such variations and changes which fall within the spirit and scope of the present invention as defined in the claims, be embraced thereby.

What is claimed is:

1. A valve, comprising:
    a housing defining an interior chamber having an inlet and an outlet;
    means for limiting a flow through the valve housing from the inlet to the outlet corresponding to a preselected flow rate corresponding to the flow through a single sprinkler head;
    valve means for preventing the flow between the inlet and the outlet said valve means including biasing means for permitting the flow between the inlet and the outlet when the pressure in the inlet of the valve exceeds a predetermined pressure; and
    means for manually permitting the flow between the inlet and the outlet of said valve means:
        wherein said means for manually permitting the flow between the inlet and the outlet of said valve means includes a rod extending through said valve means;
        wherein said valve means includes a valve member which sealingly engages a valve seat; and
        wherein said valve member is movable over said rod.

2. The valve of claim 1 wherein said inlet and said outlet are generally perpendicular to one another.

3. The valve of claim 1 wherein said biasing means includes a coil spring.

4. The valve of claim 1 wherein said means for manually permitting the flow between the inlet and the outlet of said valve means includes a cam and lever which are pivotably connected to said rod, said cam and lever moving said rod away from said inlet when said cam and lever are rotated, said rod carrying a disk which urges said valve member away from said valve seat when said rod is moved away from said inlet.

5. The valve of claim 4 wherein said means for limiting a flow through the valve housing from the inlet to the outlet comprises a preselected opening in said valve seat.

6. The valve of claim 1 wherein said means for limiting a flow through the valve housing from the inlet to the outlet comprising a preselected opening in said valve seat.

7. The valve of claim 1 wherein said means for limiting a flow through the valve housing from the inlet to the outlet corresponding to a preselected flow rate includes a restricted orifice.

8. The valve of claim 7 wherein said restricted orifice is provided in the valve seat for the valve.

9. The valve of claim 7 wherein said restricted orifice is provided in a member provided in the inlet of the valve.

10. The valve of claim 7 wherein said restricted orifice is provided in a member provided in the outlet of the valve.

11. The valve of claim 7 wherein the restricted orifice is formed integrally in the valve housing.

12. A valve, comprising:
    a housing defining an interior chamber having an inlet and an outlet, said inlet being generally perpendicular to said outlet;
    restricted orifice means for limiting a flow through the valve housing from the inlet to the outlet corresponding to the flow through a single sprinkler head;
    valve means for preventing the flow between the inlet and the outlet, said valve means including biasing means for permitting the flow between the inlet and the outlet when the pressure in the inlet of the valve exceeds a predetermined pressure; and means for manually permitting the flow between the inlet and the outlet of said valve means;

wherein said means for manually permitting the flow between the inlet and the outlet of said valve means includes a rod extending through said valve means;

wherein said valve means includes a valve member which sealingly engages a valve seat; and wherein said valve member is movable over said rod.

13. An arrangement for a fire suppression water sprinkler system, comprising:

means for supplying water to a plurality of sprinklers;

means for sensing a flow through said means for supplying water;

a valve provided downstream of said means for sensing and in communication with said means for supplying water, said valve comprising:

a housing defining an interior chamber having an inlet and an outlet;

means for limiting a flow through the valve housing from the inlet to the outlet corresponding to a preselected flow rate corresponding to the flow through a single sprinkler head;

means for preventing the flow between the inlet and the outlet;

biasing means for permitting the flow between the inlet and the outlet when the pressure in the inlet of the valve exceeds a predetermined pressure; and means for manually permitting the flow between the inlet and the outlet of said valve;

wherein said means for manually permitting the flow between the inlet and the outlet of said valve means includes a rod extending through said valve;

wherein said valve includes a valve member which sealingly engages a valve seat; and wherein said valve member is movable over said rod.

14. The arrangement of claim 13 wherein said inlet and said outlet are generally perpendicular to one another.

15. The arrangement of claim 13 wherein said biasing means includes a coil spring.

16. The arrangement of claim 15 wherein said means for preventing the flow includes the valve member which sealingly engages the valve seat.

17. The arrangement of claim 16 wherein said means for manually permitting the flow between the inlet and the outlet of said valve means includes a cam and lever which are pivotably connected to said rod, said cam and lever moving said rod away from said inlet when said cam and lever are rotated, said rod carrying a disk which urges said valve member away from said valve seat when said rod is moved away from said inlet.

18. The arrangement of claim 17 wherein said means for limiting a flow through the valve housing from the inlet to the outlet comprises a preselected opening in said valve seat.

19. The arrangement of claim 13 wherein said means for limiting a flow through the valve housing from the inlet to the outlet comprises a preselected opening in said valve seat.

20. The arrangement of claim 13 wherein said means for limiting a flow through the valve housing from the inlet to the outlet corresponding to a preselected flow rate includes a restricted orifice.

21. The arrangement of claim 20 wherein said restricted orifice is provided in the valve seat for the valve.

22. The arrangement of claim 20 wherein said restricted orifice is provided in a member provided in the inlet of the valve.

23. The arrangement of claim 20 wherein said restricted orifice is provided in a member provided in the outlet of the valve.

24. The arrangement of claim 20 wherein the restricted orifice is formed integrally in the valve housing.

25. An arrangement for a fire suppression water sprinkler system, comprising:

means for supplying water to a plurality of sprinklers;

means for sensing a flow through said means for supplying water;

a valve provided downstream of said means for sensing and in communication with said means for supplying water, said valve comprising:

a housing defining an interior chamber having an inlet and an outlet, said inlet being generally perpendicular to said outlet;

restricted orifice means for limiting a flow through the valve housing from the inlet to the outlet corresponding to the flow through a single sprinkler head;

means for preventing the flow between the inlet and the outlet;

biasing means for permitting the flow between the inlet and the outlet when the pressure in the inlet of the valve exceeds a predetermined pressure; and means for manually permitting the flow between the inlet and the outlet of said valve means;

wherein said means for manually permitting the flow between the inlet and the outlet of said valve means includes a rod extending through said valve;

wherein said valve includes a valve member which sealingly engages a valve seat; and wherein said valve member is movable over said rod.

* * * * *